United States Patent Office 3,730,823
Patented May 1, 1973

3,730,823
EDGING MATERIAL FOR APPLICATION TO THE EDGES OF SUBSTRATES
Lee E. Veneziale, Jr., Tyrone, Pa., assignor to Westvaco Corporation, New York, N.Y.
No Drawing. Continuation-in-part of application Ser. No. 113,455, Feb. 8, 1971. This application Aug. 30, 1971, Ser. No. 176,233
Int. Cl. C09j 7/04
U.S. Cl. 161—82     5 Claims

ABSTRACT OF THE DISCLOSURE

A decorative, functional edging material for application to the edges of panels or substrates. The edging material is a polyester resin impregnated paper sheet coated on the back side with a high viscosity thermosetting hot-melt glue. The base of the edging material is a single sheet of paper, preferably an alpha cellulose or kraft saturating paper having a basis weight of at least 65 pounds, impregnated with a polymerizable unsaturated polyester resin. The hot-melt glue is an ethylene-vinyl acetate copolymer, having certain definite characteristics which enable the edging to become permanently bonded to the edge panel surface under temperature and pressure. The sheet, impregnated with a polymerizable polyester resin, is suitably cured to give a non-cracking edging material, coated with the hot-melt glue, and cut into strips of suitable widths and wound into rolls.

CROSS-REFERENCE TO RELATED APPLICATIONS

This application is a continuation-in-part of the applicant's co-pending application, Ser. No. 113,455 filed Feb. 8, 1971.

BACKGROUND OF THE INVENTION

(1) Field of the invention

This invention relates to a decorative edging material for shelving, cabinets, furniture and the like. More particularly, this invention relates to an edging material for edges of panels or substrates which comprises a strip of paper impregnated with a polymerizable unsaturated polyester resin and coated on one side thereof with a high viscosity hot-melt glue that is heated with an applicator which firmly bonds the edging material with pressure to the desired edge.

(2) Description of the prior art

The panel edges of laminated materials for use as shelving, table tops and cabinets have heretofore been protected in a number of ways, none of which have been entirely satisfactory. For instance, one of the problems occurs because the edge of the panels are rough, irregular or porous, containing small gaps or other imperfections. These edges are primarily the rough, unfinished edges of the core material, such as flakeboard, composite board and plywood. Although it is not necessary that the edges of shelves and desk tops, counter tops, etc., possess the high standard of quality necessary for horizontal surfaces, it is necessary that the edges present a finished smooth appearance which is not easily damaged.

One method of finishing the edge of a panel of woody material is set forth in U.S. Pat. 3,011,932 to Downing, wherein a wood veneer strip is coated with an acrylic-type or rubber base adhesive and a paper backing strip. Upon application to the core material the backing strip is removed, and the veneer strip is applied to the core material through heat and pressure or pressure alone depending upon the adhesive. Such a process of edging is rather slow and awkward as the backing strip must be individually removed from each strip and then pressure applied to stick the veneer material to the plywood. Further disadvantages include, cracking of the rather stiff veneer material.

U.S. Pat. 3,283,052, to Munk, discloses another method of bonding impregnated sheet material to the lateral surface of a compressed workpiece. Munk coats these lateral surfaces with a sheet material which consists of or is impregnated with a thermosetting plastic in a partly condensed condition. Under heat and pressure the thermosetting resin penetrates the edge portion of the workpiece to permanently lock the coating strip to the surface.

The present invention on the other hand is predicated on the discovery that a paper sheet may be impregnated with a polymerizable unsaturated polyester resin and cured, the impregnated sheet coated with a high viscosity hot-melt glue, cut into edging strips while still retaining sufficient flexibility to be rolled.

Accordingly, it is therefore a general object of this invention to provide an edging material for a panel or substrate which comprises a polyester impregnated saturating grade paper having a high viscosity hot-melt glue applied to one side thereof which is cut into strips substantially the width of the material to be covered and rolled into convenient rolls. A further object of this invention is to provide an edging material in which the surface edge will cover defects, have a high resistance to abrasion, moisture, deterioration and decay and which will not peel off or delaminate. An even further object of this invention is to provide a material for banding to the rough edge of a rigid substrate which may be easily and conveniently applied thereto in a continuous contact operation of heat and pressure requiring but a few seconds.

Other objects, features and advantages of this invention are apparent in the following description.

SUMMARY OF THE INVENTION

The present invention provides an edging material which can be applied to the edges of both high and low density substrates to provide both decorative and functional edging. It has been found that this edging material may be made by impregnating a paper sheet of saturating paper or alpha cellulose paper having a basis weight of at least 65 pounds per 3000 square feet with at least 50% by weight of a polymerizable unsaturated polyester resin and substantially curing. The cured impregnated sheet is then coated with, by way of example, an ethylene-vinyl acetate copolymer hot-melt glue. The edging material is cut into strips of suitable width and wound into rolls. In a preferred embodiment the cured polyester resin impregnated sheet has applied to its back side a coating of polyester fibers prior to coating with the hot-melt glue.

DETAILED DESCRIPTION OF THE INVENTION

As has been indicated above, the polyester resin impregnated, decorative edging material of this invention is intended for application to numerous types of rigid substances including plywood, hardboard, composition board, particle board, bagasse board, lumber, sheet metal, asbestos board, and laminates to name a few illustrative types. These rigid substrates may be of various thicknesses and have smooth or irregular edges.

A wide variety of paper sheets may be used in making the edging material. However, to perform satisfactorily the paper must be able to adsorb a large quantity of resin. Suitable paper sheets comprise, for example, sheets of cellulose material such as various saturating and impregnating papers, from kraft and sulfite pulps, and alpha cellulose paper. Satisfactory edging material may be made from alpha cellulose sheets having a basis weight of 65 to 95 pounds per 3000 square feet. When kraft or sulfite saturating sheets are used, satisfactory edging material is made from sheets having a basis weight between 80 and 99 pounds per 3000 square feet.

The sheet may be bleached, unbleached or colored. It is preferable that the sheet serve as a decorative sheet in addition to its physical functions. The decorative sheet is generally printed on at least one surface with a design. The design may also be dyed, pigmented or painted to impart a color thereto as though it were part of the horizontal surface. An important aspect is the ability to print the sheet with a decorative pattern, such as a wood grain. In the past, saturating kraft papers have not been printed because of the relatively coarse fibers do not print well. However, it has been found that high quality printing may be done if the saturating kraft sheet is calendered on the printed side of the sheet. Additionally, a kraft sheet containing one surface of short, hardwood fibers given an improved printing sheet.

Whether the sheet used is a kraft sheet or alpha cellulose sheet, it is impregnated with a polymerizable unsaturated polyester resin. The sheets contain from 50% by weight up to as much as 65% by weight of the polyester resin and preferably contains from about 55-60% by weight of the polyester resin.

As is well known, the term "polyester resin" applies to synthetic resins produced by the reaction of diabasic acids with dihydric alcohols. Unsaturated polyester resins generally are produced by using a mixture of unsaturated diabasic acid, such as maleic anhydride, fumaric acid, itaconiac acid, such as isophthalic acid, adipic acid, azelaic acid, phthalic anhydride and mixtures thereof. The mixture of saturated and unsaturated diabasic acids is reacted with a dihydric alcohol such as ethylene glycol, diethylene glycol, propylene glycol, dipropylene glycol, butylene glycol, and mixtures thereof to produce an unsaturated polyester resin. To obtain a greater degree of polymerization it is customary to blend the resultant unsaturated polyester resin with a reactive monomer, which generally acts as a solvent for the unsaturated polyester and copolymerizes the unsaturation in the polyester chain to yield a cured, thermoset product. Various unsaturated monomers can be used to cross link the polyester resin, including vinyl compounds such as styrene, alpha-methyl styrene, vinyltoluene, vinyl acetate, diallyl phthalate, diacetone acrylamide, methyl acrylate, methyl methacrylate, chlorostyrene, divinyl benzene, triallyl cyanurate, and mixtures thereof. For the purposes of this specification, the various polyester resins resulting from the above types of acids and alcohols, which may include one or more cross-linking monomers, will be referred to as "polymerizable unsaturated polyester resins." The particular polyester resin employed is not of great importance; if one type is preferred, it is those resins prepared in known manner from a mixture of isophthalic and fumaric acids at a mole ratio 1:1 reacted with polypropylene glycol with a cross-linking monomer for the resulting unsaturated polyester resin being diallyl phthalate. The complete resin will have an average molecular weight between 3,000 and 3,500. Additionally, small amounts, i.e., 5-10% by weight of hexamethyl methoxy melamine may be used to aid copolymerization. Of course, as is known, the blend of unsaturated polyester resin and cross-linking monomer will preferably include suitable catalyst such as peroxy compounds, and accelerators, as well as flow control agents.

The polymerizable unsaturated polyester resin is applied to the sheet forming the edging material of this invention by an suitable application, such as dipping, coating and other means of metering a solvent solution of resin. Suitable solvents for the resin may be used for coating applications such as various ketones and esters including acetone, ethyl ketone, ethyl acetate, and butyl acetate as well as aromatic solvents such as benzene, toluene and xylene. The viscosity and resin solids content of the solvent system are adjusted for complete saturation and resin pickup. The sheet can be surface coated with the polyester resin or saturated with the resin. Regardless of the method of application, it is preferred, but not necessary, that more resin be located on the decorative face of the paper sheet than on the back side thereof. The sheet is then dried at a temperature high enough to remove substantially all of the volatiles and permanently polymerize or cure the polyester resin.

As stated, the edging material of this invention is not dependent upon the use of a particular polymerizable unsaturated polyester resin. Those skilled in the art will appreciate that any such polyester resin may be used to saturate the sheets forming the overlay of the present invention as long as the resin is curable at the temperatures and time practically stated. One suitable, commercially available polyester resin is Reichhold Chemical Company's Polylite 93–516. An isophthalic type of unsaturated polyester resin is preferred but the present invention is not limited thereto.

One of the major problems confronting an edging material, as well as laminates in general, is good adhesion to the core material. Although satisfactory adhesion to a rigid core material is obtained with just the polyester impregnated paper disclosed, another aspect of this invention includes a product having even better adhesion characteristics. In this embodiment, a nonwoven sheet of spinbonded polyester fibers is bonded to the back of the polyester resin impregnated sheet prior to applying the hot-melt glue. These nonwoven sheets are produced, for example, as a sheet of continuous-filament polyester fibers that are randomly arranged, highly dispersed, and bonded at the filament junction and produced from either straight or crimped fibers. One such product is sold under the trademark "Reemay" by Du Pont. The use of a polyester nonwoven sheet bonded to the back of the resin impregnated paper sheet also adds flexibility to the strip material preventing it from cracking when wound or when being applied around a corner.

After curing, the polyester resin impregnated sheet is passed through an adhesive applicator where a hot-melt glue is coated on one side of the sheet. Any conventional adhesive applicator may be used and particularly good results may be obtained using a gravure roll which leaves an open web pattern of 10 to 12 microns thickness. The hot-melt glue is generally applied at a rate of 0.1–1.0 pound of hot-melt per 10 square feet of impregnated paper. The coating temperature will depend upon the particular hot-melt system used.

The hot-melt glues or adhesives contemplated include those glues from well known hot-melt adhesive systems such as polyamides, ethylene-vinyl acetate and polyvinyl acetates. The hot-melt glue used is critical. The hot-melt glue must have a high viscosity, that is, above 60,000 centipoise at 200° C. The high viscosity hot-melt glues are necessary to achieve satisfactory adhesion and are applied at 400 to 450° F. By having the ability to apply the edging at a high temperature the hot-melt is dried to a tight bond in just seconds. In order to use an edging material at 400° F. and above it is necessary to have a polyester impregnated sheet because the more conventional melamine resin systems are destroyed at these high temperatures. The make-up of those hot-melt systems may include in addition to the resin, plasticizers and extenders. Particular polyamide hot-melt systems include "Emery 3749" which is a trademark of Emery Industries, and "Foral 85" which is a trademark of Hercules Powder Company. Examples of a polyvinyl acetate system include "Gelva V" which is a trademark of Monsanto Company. The preferred hot-melt is a high viscosity hot-melt adhesive which is a pigment extended, resin modified, ethylene-vinyl acetate copolymer. These hot-melt adhesives have, for example, a viscosity at 200° C. of 75,000–100,000 centipoise, a Ring and Ball melting point of 97–100° C., and a Penetrameter, 150 grams at 25° C. of 6.0 to 8.0. One hot-melt ethylene-vinyl acetate copolymer that provides the particular satisfactory adhesion for the edging material of this invention is sold by Pierce and Stevens Chemical Corporation under the trademark "P-350 High Viz."

The edging material after coating with the hot-melt glue is cut into strips substantially as wide as the material to be bonded, i.e., ⅜" to 1 inch or more, and rolled in rolls of convenient lengths, such as 100–200 feet.

The edging material can then be easily bonded or glued with heat and pressure to any suitable substrate such as plywood, gypsum board, lumber, particle board, hardwood, metal, flakeboard, cement asbestos board and composition boards. One particularly effective method of applying this material to a substrate is set forth in my co-pending application, U.S. Ser. No. 113,455, filed Feb. 8, 1971, wherein there is set forth an invention entitled "Edge Banding Machine." This machine provides an apparatus designed to take the best advantage of this discovery that a hot-melt thermoplastic adhesive is most desirable for edge banding. The hot-melt adhesive as used in this invention allows the edge banding operation to be performed without the necessity of removing the backing layer normally required for a pressure sensitive adhesive. Hence, the machine was developed for use with edge banding having the new type adhesive substantially different from adhesive used heretofore. The edge banding machine was arranged to permit the user to apply the edging material of this invention at a greater rate than could heretofore be performed. The apparatus develops maximum contact pressure between the edging material and the heated platen. This feature allows the hot-melt adhesive applied to the back side of the edging material to become completely melted at the greatest possible rate and permits the adhesive to remain activated in the longest possible time during the edge banding process. The apparatus also provides means for properly and continuously aligning the edging material with the panel edge and for applying a uniform initial pressure to the edge band panel immediately after the edge band is contacted with the panel edge. The edge banding materials utilized for surfacing the core material or edges is of the width selected to be equal the thickness of the core panel material. Another advantage of using the hot-melt adhesive is applied to the edge banding material in the manner set forth of this invention is that an excessive adhesive is substantially prevented and when it is heated and applied to the core material there is not excess to ooze out from between the core material and what this means is that there is no danger of leaving unsightly joints.

As one skilled in the art will appreciate, various changes may be made in the examples and descriptions set forth above without departure from the spirit of the invention or the scope of the appended claims.

What is claimed is:

1. A flexible, impact-resistant, highly masking edging material for surfacing the edge of a rigid substrate which comprises a prefabricated strip of paper of a width substantially equal to the thickness of said substrate impregnated with a cured thermosetting polyester resin and coated on one side thereof with a high viscosity, hot-melt glue having a viscosity of at least 60,000 centipoise at 200° C.

2. The edging material of claim 1 wherein said paper is a kraft sheet having a basis weight of from 80–99 pounds per 3000 square feet and contains from 50 to 65% by weight of said polyester resin.

3. The edging material of claim 1 wherein said paper is an alpha cellulose sheet having a basis weight of from 65 to 95 pounds per 3000 square feet and contains from 50 to 65% by weight of said polyester resin.

4. The edging material of claim 1 wherein said high viscosity, hot-melt glue is an ethylene-vinyl acetate copolymer having a viscosity of between 75,000 and 100,000 centipoise at 200° C.

5. The edging material of claim 1 which comprises a layer of polyester fibers bonded to cured polyester resin impregnated paper between said paper and hot-melt glue.

References Cited

UNITED STATES PATENTS

| | | | |
|---|---|---|---|
| 2,748,046 | 5/1956 | Works et al. | 117—122 H X |
| 3,539,444 | 11/1970 | Schneider et al. | 117—76 P X |
| 3,341,626 | 9/1967 | Peterkin | 117—122 H X |
| 3,560,420 | 2/1971 | Tamura et al. | 117—122 PA X |
| 2,753,285 | 7/1956 | Pahl et al. | 117—76 A X |
| 3,437,506 | 4/1969 | Falberg | 117—122 H X |

FOREIGN PATENTS 1,137,210  9/1962  Germany _____ 117—76 P

RALPH HUSACK, Primary Examiner

U.S. Cl. X.R.

117—4, 75 P, 76 A, 122 H; 161—88, 156, 250